United States Patent
Kim et al.

(10) Patent No.: US 11,327,520 B1
(45) Date of Patent: *May 10, 2022

(54) FOLDABLE PEDAL APPARATUS FOR VEHICLE WITH HYSTERESIS MODULE

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Ji Soo Kim, Daegu (KR); Hyeon Uk Kim, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,032

(22) Filed: May 18, 2021

(30) Foreign Application Priority Data

Nov. 12, 2020 (KR) .......................... 10-2020-0151289

(51) Int. Cl.
| | |
|---|---|
| *G05G 1/40* | (2008.04) |
| *B60K 26/02* | (2006.01) |
| *G05G 5/05* | (2006.01) |
| *B60T 7/06* | (2006.01) |
| *B60T 7/04* | (2006.01) |
| *G05G 1/44* | (2008.04) |
| *G05G 1/38* | (2008.04) |

(52) U.S. Cl.
CPC .............. *G05G 1/40* (2013.01); *B60K 26/02* (2013.01); *B60T 7/042* (2013.01); *B60T 7/06* (2013.01); *G05G 1/38* (2013.01); *G05G 1/44* (2013.01); *G05G 5/05* (2013.01); *G05G 2505/00* (2013.01); *G05G 2700/02* (2013.01); *G05G 2700/16* (2013.01); *G05G 2700/18* (2013.01)

(58) Field of Classification Search
CPC .. G05G 1/40; G05G 2505/00; G05G 2700/02; G05G 2700/16; G05G 2700/18
See application file for complete search history.

(56) References Cited

U.S. PATENT DOCUMENTS

| | | | | |
|---|---|---|---|---|
| 10,889,226 B1* | 1/2021 | Dean | ......................... | G05G 5/28 |
| 10,906,514 B1* | 2/2021 | Kim | ......................... | G05G 1/40 |
| 10,946,741 B1* | 3/2021 | Kim | ......................... | G05G 1/40 |
| 11,021,058 B1* | 6/2021 | Kim | ......................... | G05G 5/03 |

(Continued)

FOREIGN PATENT DOCUMENTS

| | | |
|---|---|---|
| KR | 10-1518899 B1 | 5/2015 |
| KR | 10-2017-0137427 A | 12/2017 |
| KR | 10-2021-0158464 | 12/2021 |

*Primary Examiner* — Vicky A Johnson
(74) *Attorney, Agent, or Firm* — Morgan, Lewis & Bockius LLP

(57) ABSTRACT

A foldable pedal apparatus of a vehicle with a hysteresis module, may include a pedal pad is in a popped-up state of protruding from a pedal housing to be exposed toward a driver, in a manual driving mode in which the driver directly drives the vehicle; the pedal pad is in a hidden state of being inserted into the pedal housing and blocked from being exposed to the driver, in the autonomous driving mode in which the driver does not directly drive the vehicle; and hysteresis may be implemented by a hysteresis module when the pedal pad is operated.

20 Claims, 11 Drawing Sheets

(56) References Cited

U.S. PATENT DOCUMENTS

2007/0157755 A1* 7/2007 Kim .................. B60K 26/02
  74/513
2014/0373667 A1* 12/2014 Kim .................. G05G 1/40
  74/513

* cited by examiner

FOLDABLE PEDAL APPARATUS FOR VEHICLE WITH HYSTERESIS MODULE

CROSS REFERENCE TO RELATED APPLICATION

The present application claims priority to Korean Patent Application No. 10-2020-0151289, filed on Nov. 12, 2020, the entire contents of which is incorporated herein for all purposes by this reference.

BACKGROUND OF THE INVENTION

Field of the Invention

The present invention relates to a foldable pedal apparatus for a vehicle with a hysteresis module, and more particularly, to a foldable pedal apparatus for a vehicle with a hysteresis module, in which: a pedal pad protrudes from a pedal housing to be exposed toward a driver to make it possible for the driver to operate the pedal pad, in a manual driving mode in which the driver directly drives the vehicle; and the pedal pad is inserted into the pedal housing and blocked from being exposed to the driver to make it impossible for the driver to operate the pedal pad, in an autonomous driving mode.

Description of Related Art

In recent years, there has been a rapid progress in the development of a smart vehicle incorporating autonomous driving technology in which the vehicle navigates to a destination by itself even though a driver does not directly operate a steering wheel, an accelerator pedal, a brake, etc.

If the autonomous driving mode becomes popular, the driver may select either one of a manual driving mode in which the driver directly drives the vehicle and an autonomous driving mode in which the vehicle drives to the destination by itself and the driver does not directly drives the vehicle.

In the autonomous driving mode, the driver is expected to stretch out and take a comfortable rest, and the driver's rest may thus be interfered by an accelerator or brake pedal disposed in a space below a driver's seat, if the pedal remains exposed indoors.

Furthermore, the autonomous driving mode is a mode in which a driver does not operate the accelerator or brake pedal of a vehicle. Accordingly, if the driver operates the pedal during the autonomous driving, a vehicle controller may thus end its control for the autonomous driving by determining that the driver wants to end the autonomous driving and directly drive the vehicle.

However, the pedal of the vehicle is configured to be exposed to the space below the driver's seat, and there is a risk that the driver unknowingly operates (mal-operates) the pedal in the autonomous driving mode. In the instant case, an accident may occur depending on a road situation or a distance between vehicles.

Therefore, it is required to develop a pedal apparatus technology in which: its pedal pad is exposed toward the driver to make it possible for the driver to operate the pedal, in the manual driving mode in which the driver directly drives the vehicle; and the pedal pad is blocked from being exposed to make it impossible for the driver to operate the pedal for securing the driver's comfortable rest and safety by preventing the driver's mal-operation of the pedal pad, in the autonomous driving mode.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable pedal apparatus of a vehicle with a hysteresis module, in which: a pedal pad protrudes from a pedal housing and is exposed toward a driver to make it possible for the driver to operate the pedal pad, in a manual driving mode in which the driver directly drives the vehicle; the pedal pad is inserted into the pedal housing and blocked from being exposed to the driver to make it impossible for the driver to operate the pedal pad, in an autonomous driving mode; and hysteresis may be implemented, allowing the driver to take a comfortable rest in the autonomous driving mode, and furthermore, improving the driver's safety by preventing the driver's mal-operation of the pedal in the autonomous driving mode.

According to various exemplary embodiments of the present invention, a foldable pedal apparatus of a vehicle with a hysteresis module includes: a pedal housing fixed in a predetermined place of the vehicle below a driver's seat; a pedal pad pivotably coupled to the pedal housing and configured to be operated by the driver; a hysteresis module pivotably provided in the pedal housing, connected to the pedal pad, and configured for generating hysteresis when the pedal pad is operated by the driver; a motor fixed in the pedal housing; and a support member configured to be in contact with the pedal housing and the hysteresis module, and connected to the motor to perform an advance movement or a retreat movement by power of the motor, wherein the pedal pad may be changed to a hidden state of being inserted into and hidden in the pedal housing or to a popped-up state of protruding from the pedal housing as the hysteresis module is pivoted by the advance movement or the retreat movement of the support member.

The foldable pedal apparatus of a vehicle with a hysteresis module may further include a motor control printed circuit board (PCB) fixed in the pedal housing and electrically connected to the motor to control an operation of the motor.

The pedal pad may be an organ-type pad in which the pedal pad has a lower end portion pivotably coupled to the pedal housing by a hinge pin, is connected to the hysteresis module above the hinge pin, and has an upper end portion pivoted forwards and backwards centered on the hinge pin.

The foldable pedal apparatus of a vehicle with a hysteresis module may further include a pedal return spring having first and second end portions supported by the pedal housing and the hysteresis module, respectively, and providing the pedal pad with an elastic force for the pedal pad to be pivoted in a direction in which the pedal pad is inserted into the pedal housing.

The hysteresis module may be pivoted while overcoming the elastic force of the pedal return spring when the support member performs the advance movement by an operation of the motor to be inserted between the pedal housing and the hysteresis module; and the pedal pad may be changed to the popped-up state of protruding from the pedal housing when the support member is in a state of propping up and supporting the hysteresis module.

When the support member performs the retreat movement by the operation of the motor and is released from the state of propping up and supporting the hysteresis module, the pedal pad may receive the elastic force of the pedal return spring through the hysteresis module, and may be pivoted to be changed to the hidden state of being inserted into the pedal housing.

The hysteresis module may include: a lever housing having one end portion pivotably coupled to a fixed shaft disposed in the pedal housing and supported by the support member by overlapping the support member when the support member performs the advance movement; a pivoted lever disposed in the lever housing and provided pivotably by having a hinge portion passing through the fixed shaft on its one end; a friction bush coupled to the fixed shaft and generating a friction force by being in contact with the pivoted lever when the pivoted lever is pivoted; a connection link pivotably connecting the other end portion of the pivoted lever and the pedal pad with each other; and a lever spring having first and second end portions supported by the lever housing and the pivoted lever, respectively.

The foldable pedal apparatus of a vehicle with a hysteresis module may further include: a permanent magnet coupled to the hinge portion of the pivoted lever; and a non-contact pedal sensor fixed in the pedal housing to face the permanent magnet, wherein the non-contact type pedal sensor may detect a pivoted angle of the pedal pad by a change in a magnetic flux of the permanent magnet when the pivoted lever is pivoted, generating a signal related to a function of a pedal.

The support member may be configured to be in contact with a forward inclined surface of the pedal housing; and the fixed shaft provided as a pivoted center of the hysteresis module may be disposed between the forward inclined surface and a backward inclined surface of the pedal housing, making the pivoted center of the hysteresis module to be eccentrically disposed to be more backward than the support member.

Both one surface of the support member and the forward inclined surface of the pedal housing may be flat, and the one surface of the support member and the forward inclined surface may always be in surface-contact with each other.

The lever housing may have a surface in contact with the support member, the surface having a curved portion and a flat portion; the curved portion of the lever housing may allow entry of the support member for the support member to be inserted between the pedal housing and the lever housing when the support member is configured to perform the advance movement in a state of being retreated; and the flat portion of the lever housing may be supported by the support member while overlapping the other surface of the advance-moved support member.

The other surface of the support member may be flat and always be in surface-contact with the flat portion of the lever housing.

When the hysteresis module is pivoted as the support member performs the advance movement or the retreat movement by the operation of the motor, and a position of the permanent magnet is changed while the pedal pad is pivoted to be in the hidden or popped-up state as the hysteresis module is pivoted, the non-contact type pedal sensor does not generate the signal related to the function of the pedal to prevent a malfunction of the pedal.

In a case where the pedal pad is in the popped-up state and the motor is not operated, only when the position of the permanent magnet is changed as the pedal pad is pivoted by the driver's operation, the non-contact type pedal sensor may generate the signal related to the function of the pedal.

A sensor pin may be coupled to the pedal pad; and the sensor pin may be coupled to a sensor lever of a stroke sensor fixed to the pedal housing.

The hinge pin may be disposed below a lower end portion of a pad surface disposed on the pedal pad to allow the lower end portion of the pad surface to be exposed from the pedal housing when the pedal pad is in the popped-up state.

The pedal housing may have a guide portion guiding the advance movement and the retreat movement of the support member for the support member to be moved in a state of being always in contact with the forward inclined surface of the pedal housing.

The non-contact type pedal sensor may be either one of an accelerator position sensor (APS) generating a signal related to acceleration and a brake position sensor (BPS) generating a signal related to braking.

The foldable pedal apparatus according to various exemplary embodiments of the present invention may be used as either one of an accelerator pedal apparatus and a brake pedal apparatus in an autonomous driving vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
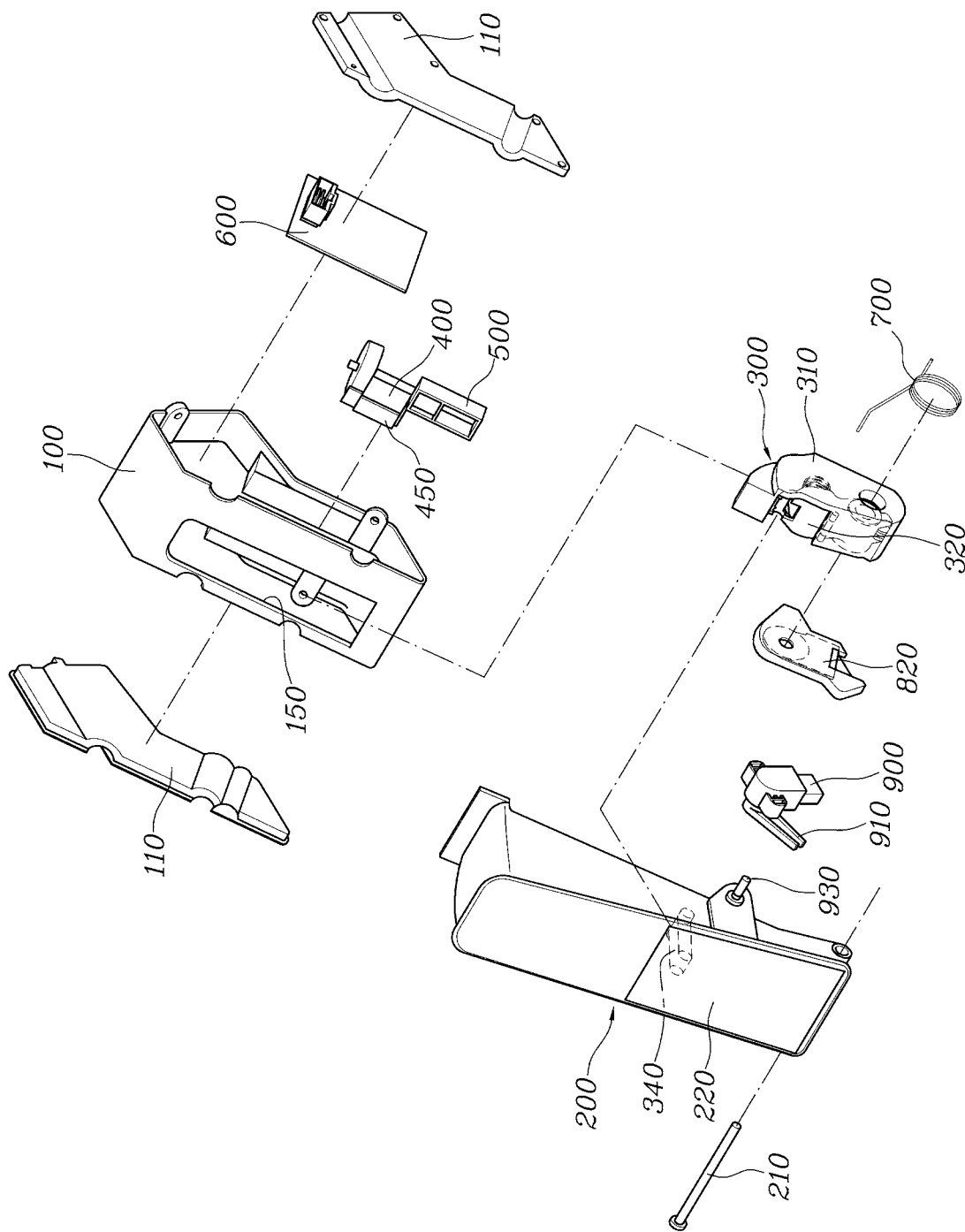
FIG. 1 is an exploded perspective view of a foldable pedal apparatus of a vehicle with a hysteresis module according to various exemplary embodiments of the present invention.
Figure 2:
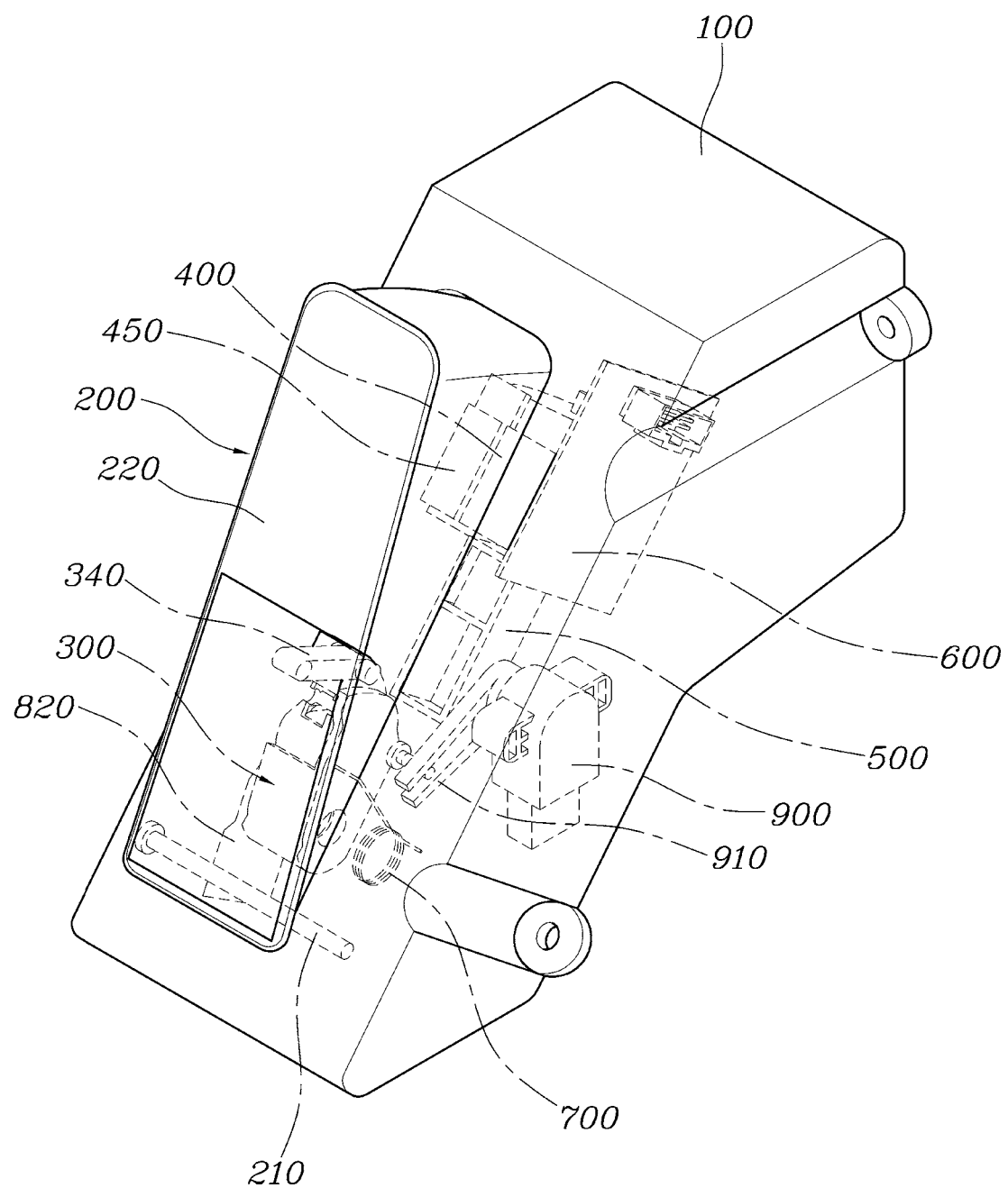
FIG. 2 is an assembled perspective view of the pedal apparatus of FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific descriptions on structure and function of embodiments of the present invention described herein are merely illustrative. The exemplary embodiments may be implemented in various forms and the above descriptions are not construed to limit the present invention thereto.

The present invention may be variously modified and have several exemplary embodiments of the present invention, and specific exemplary embodiments will thus be shown in the accompanying drawings and be described in detail. However, it is to be understood that the present invention is not limited to the specific exemplary embodiments of the present invention, and includes all modifications, equivalents and substitutions included in the spirit and the scope of the present invention.

Terms such as "first", "second", etc., may be used to describe various components, and the components are not to be construed as being limited to the terms. The terms are used only to distinguish one component from another component. For example, the "first" component may be named the "second" component and the "second" component may also be similarly named the "first" component, without departing from the scope of the present invention.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "coupled directly to" another element, it may be connected to or coupled to another element without the other element intervening therebetween. Other expressions describing a relationship between components, that is, "between," "directly between," "neighboring to," "directly neighboring to" and the like, may be similarly interpreted.

Terms used in the present specification are used only to describe specific exemplary embodiments rather than limiting the present invention. Singular forms used herein are intended to include plural forms unless explicitly indicated otherwise. It will be further understood that the terms "comprise" or "have" used in the present specification, specify the presence of stated features, numerals, steps, operations, components, parts, or a combination thereof, and do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It may be understood that the terms defined by the dictionary are identical with the meanings within the context of the related art, and they may not be ideally or excessively formally defined unless the context clearly dictates otherwise.

A control unit (controller) according to various exemplary embodiments of the present invention may be implemented by an algorithm configured to control operations of various components of a vehicle, a nonvolatile memory configured to store data related to software instructions reproducing the algorithm, and a processor configured to perform operations described below using the data stored in the memory. Here, the memory and the processor may be implemented as separate chips. Alternatively, the memory and the processor may be implemented as a single chip integrated with each other. The processor may be implemented as one or more processor chips.

Hereinafter, a foldable pedal apparatus of a vehicle with a hysteresis module according to exemplary embodiments of the present invention is described with reference to the accompanying drawings.

As shown in FIGS. 1 to 11, a foldable pedal apparatus according to various exemplary embodiments of the present invention includes: a pedal housing 100 fixed in a predetermined place of the vehicle below a driver's seat; a pedal pad 200 pivotably coupled to the pedal housing 100 and operated by the driver's foot; a hysteresis module 300 pivotably provided in the pedal housing 100, connected to the pedal pad 200, and generating hysteresis when the pedal pad 200 is operated by the driver; a motor 400 fixed in the pedal housing 100; and a support member 500 configured to be in contact with the pedal housing 100 and the hysteresis module 300, and connected to the motor 400 to perform an advance movement or a retreat movement by power of the motor 400.

The pedal pad 200 may be changed to a hidden state of being inserted into and hidden in the pedal housing 100 or to a popped-up state of protruding from the pedal housing as the hysteresis module 300 is pivoted by the advance movement or the retreat movement of the support member 500.

The pedal housing 100 may be formed in the shape of a box having an empty interior; a cover 110 may be detachably coupled to its opposite sides; and the hysteresis module 300, the motor 400, the support member 500, and a motor control printed circuit board (PCB), a non-contact type pedal sensor, and the like, to be described below, may be provided in the empty interior space.

The motor 400 may be a pivoted type motor, and the pivoted type motor may be a step motor and electrically connected to a power supply.

The motor 400 may transmit the power through a first gear 410 and a second gear 420, and one end portion of a lead screw 430 may be coupled to the center of the second gear 420, and a nut 440 may be coupled to the lead screw 430, and the nut 440 may be coupled to the support member 500.

The support member 500 may be configured to be guided by a guide portion 120 disposed in the pedal housing 100 and to be always in contact with a forward inclined surface 130 of the pedal housing 100.

Therefore, when the motor 400 is operated to pivot the first gear 410, the second gear 420 and the lead screw 430, the support member 500 in which the nut 440 is disposed may perform the advance movement or the retreat movement in a longitudinal direction of the lead screw 430.

The motor 400, the first gear 410 and the second gear 420 may be enclosed by a motor housing 450 to be protected, and the motor housing 450 may be fixedly coupled to the pedal housing 100.

The guide portion 120 formed in the pedal housing 100 is configured to guide the advance movement or the retreat movement of the support member 500. To the present end, the guide portion 120 may guide one surface of the support member 500 facing forward and the other surface thereof facing backward, respectively.

Furthermore, the present invention may further include a motor control printed circuit board (PCB) 600 fixed in the pedal housing 100 and electrically connected to the motor 400 to control an operation of the motor 400.

The motor control PCB 600 may be electrically connected to the power supply such as a battery by a wire.

The pedal pad 200 may be an organ-type pad in which the pedal pad has a lower end portion pivotably coupled to the pedal housing 100 by a hinge pin 210, is connected to the hysteresis module 300 at its portion above the hinge pin 210, and has an upper end portion pivoted forwards and backwards centered on the hinge pin 210 at its lower end portion.

Figure 9:
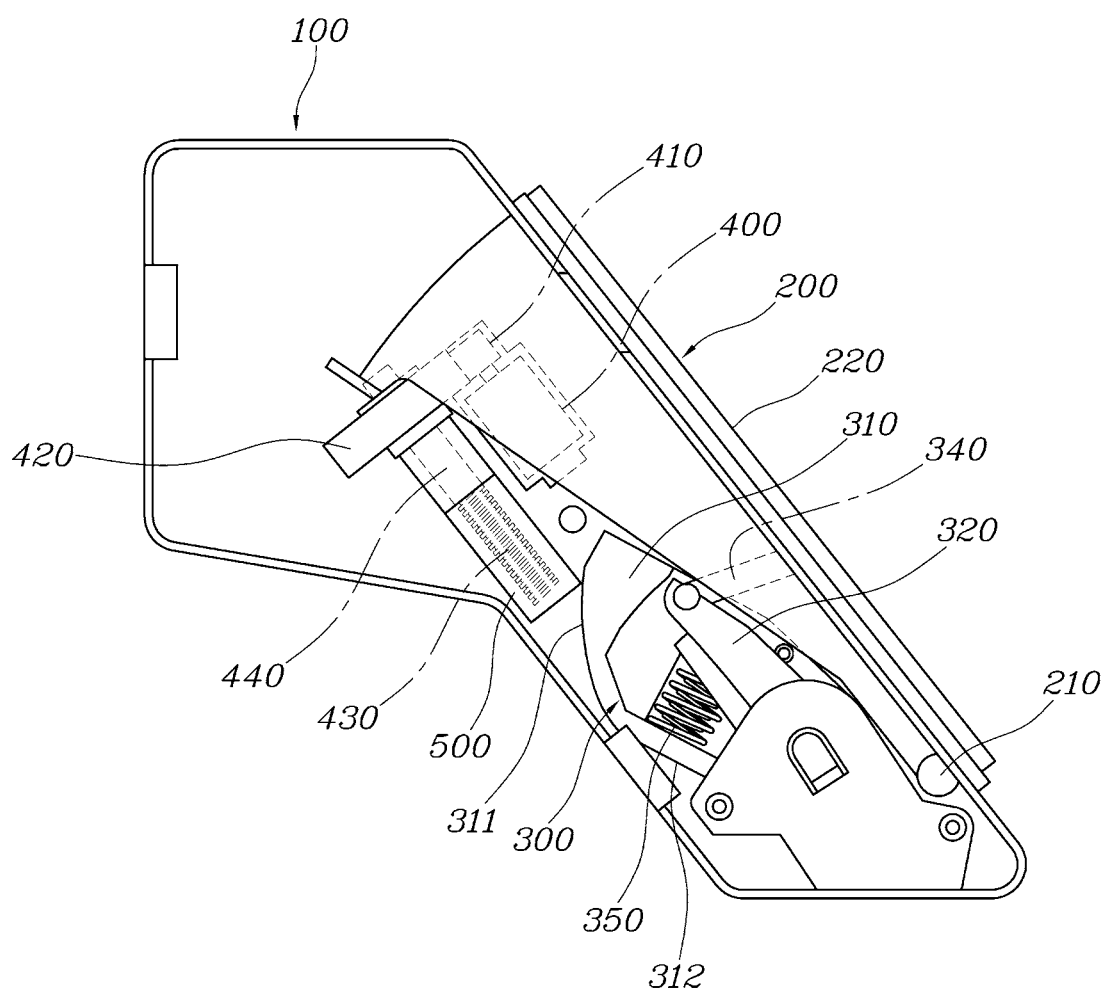
FIG. 9 is a view showing that the pedal pad is in a hidden state of being inserted into a pedal housing.

Furthermore, the pedal pad 200 may have an internal space open downward, and the motor 400 may be inserted into the internal space of the pedal pad 200 when the pedal pad 200 is changed from the popped-up state to the hidden state (see FIG. 9). In the present manner, the pedal apparatus may have an efficient layout structure, significantly reducing a size of the pedal housing 100 and its overall external size.

A housing hole 150 may be formed in a backward inclined surface 140 of the pedal housing 100, which faces the driver, the pedal pad 200 may be disposed to pass through the housing hole 150, and may have the lower end portion pivotably coupled to the pedal housing 100 by the hinge pin 210.

Furthermore, the present invention may further include a pedal return spring 700 having opposite end portions respectively supported by the pedal housing 100 and the hysteresis module 300, and providing the pedal pad 200 with an elastic force for the pedal pad 200 to be pivoted in a direction in which the pedal pad 200 is inserted into the pedal housing 100.

Figure 3:
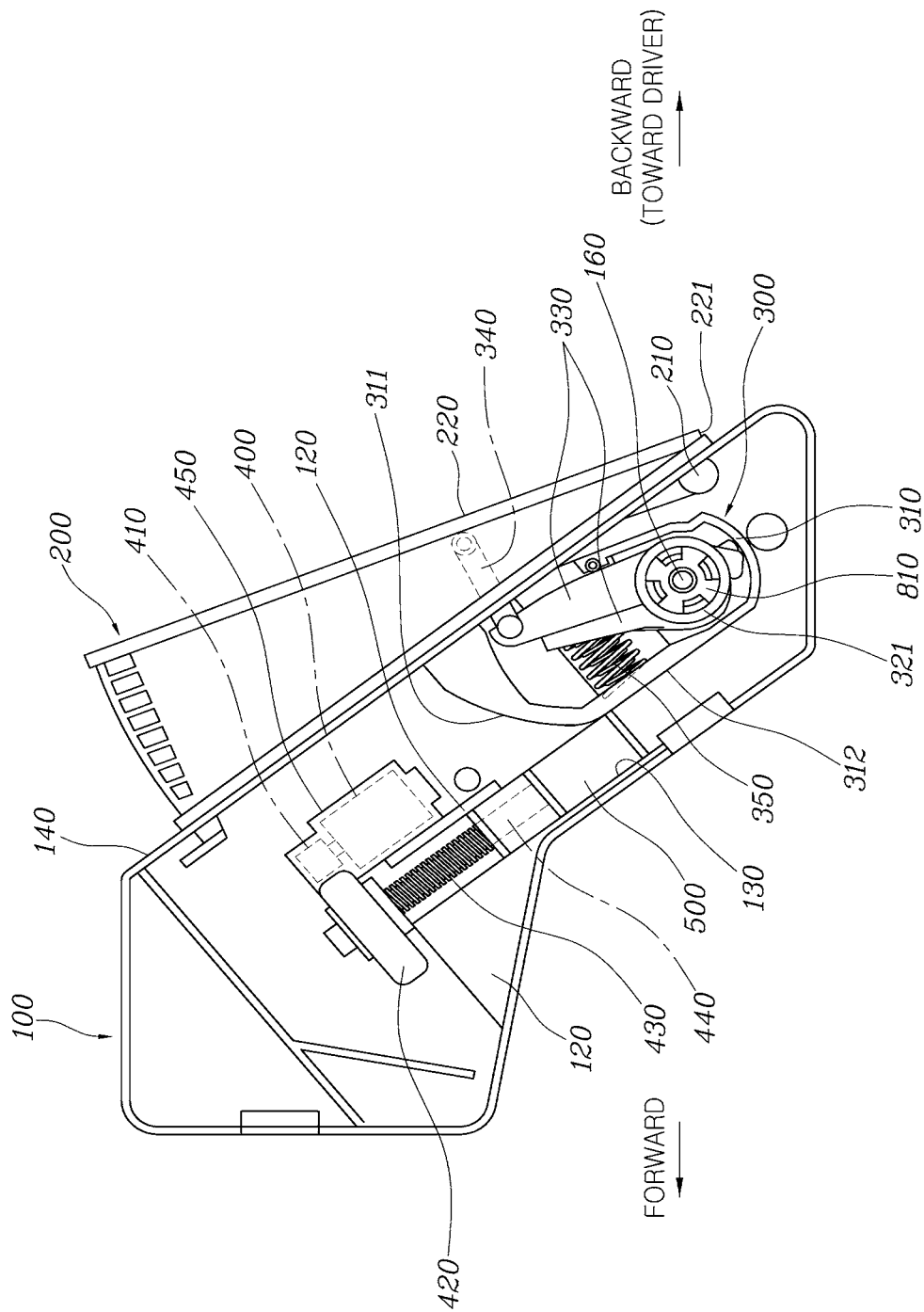
FIG. 3 is a side view of the pedal apparatus of FIG. 2.
Figure 4:
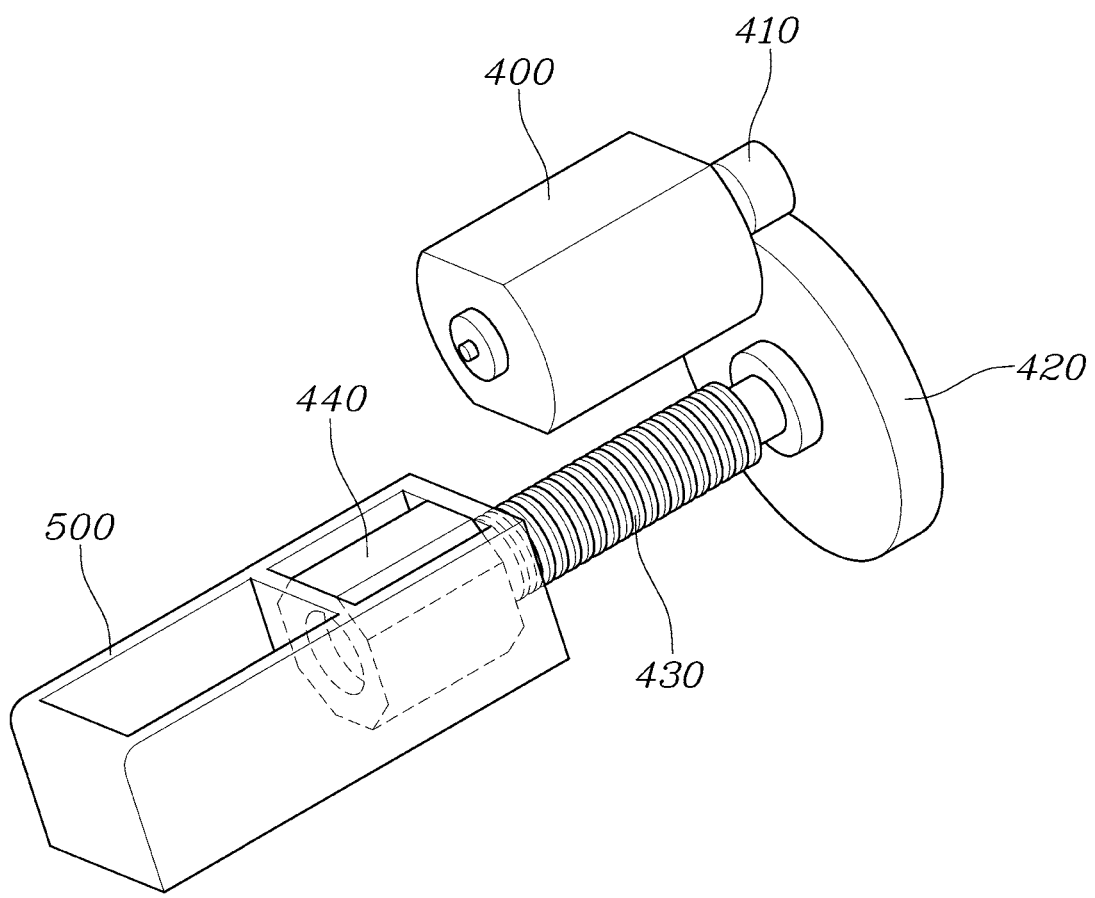
FIG. 4 is a view of a motor and a support member according to various exemplary embodiments of the present invention.
Figure 5:
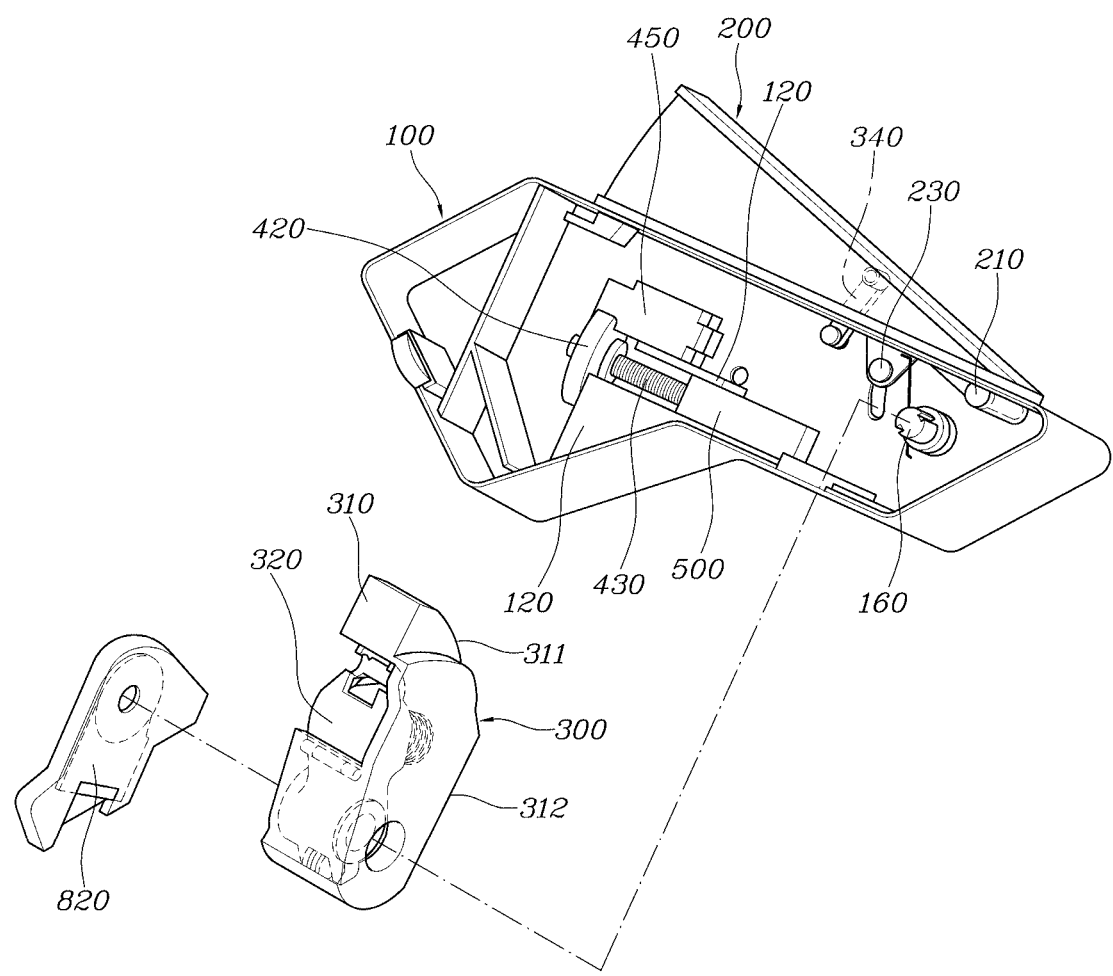
FIG. 5 is a view of a coupling structure of the hysteresis module.
Figure 6:
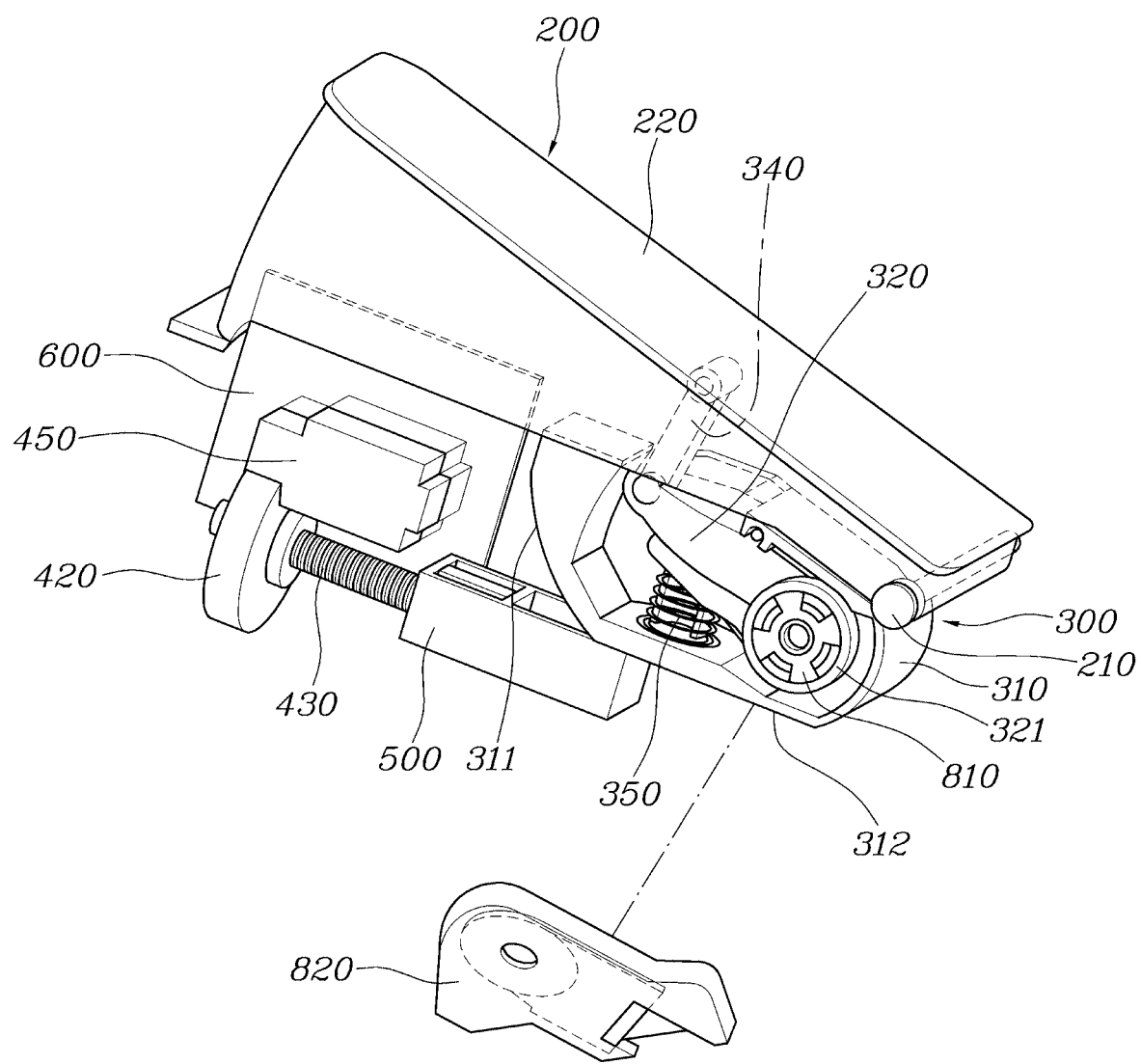
FIG. 6 is a view of a permanent magnet and a non-contact type pedal sensor coupled to the hysteresis module.
Figure 7:
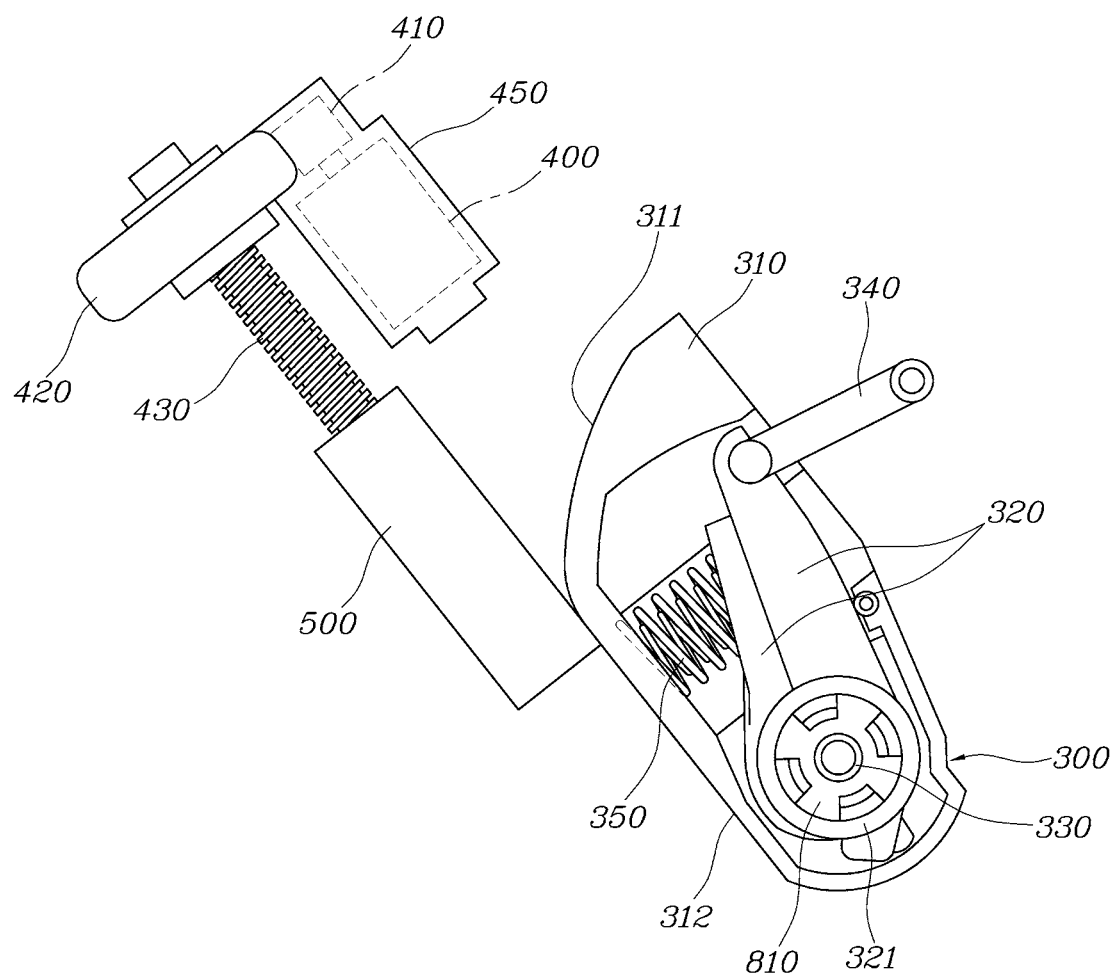
FIG. 7 is a view of the support member and the hysteresis module.
Figure 10:
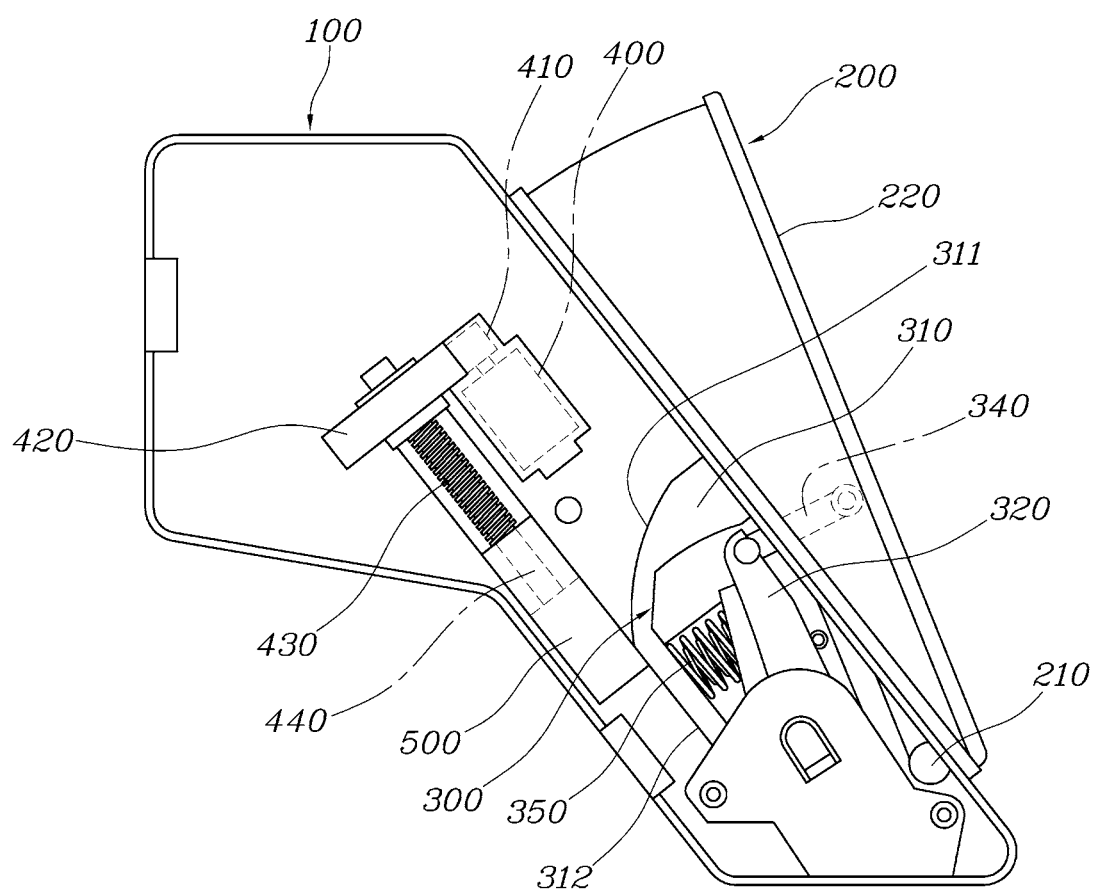
FIG. 10 is a view of showing that the pedal pad is in a popped-up state of protruding from the pedal housing.

Therefore, the hysteresis module 300 may be pivoted while overcoming the elastic force of the pedal return spring 700 when the support member 500 performs the advance movement toward the hysteresis module 300 by the operation of the motor 400, and the advance-moved support member 500 is inserted between the pedal housing 100 and the hysteresis module 300; and the pedal pad 200 may be changed to the popped-up state of protruding from the pedal housing 100 when the advance-moved support member 500 is in a state of propping up and supporting the hysteresis module 300. from here, it is possible for the driver to operate the pedal pad 200 (see FIGS. 3 and 10).

Furthermore, when the support member 500 performs the retreat movement to be away from the hysteresis module 300 by the operation of the motor 400 and is released from the state of propping up and supporting the hysteresis module 300, the pedal pad 200 may receive the elastic force of the pedal return spring 700 through the hysteresis module 300, and may be pivoted to be changed to the hidden state of being inserted into the pedal housing 100. Here, it is impossible for the driver to operate the pedal pad 200 (see FIG. 9).

The backward surface of the pedal pad 200, which faces the driver may be a pad surface 220 operated by the driver's foot. The pad surface 220 of the pedal pad 200 may have an external size formed greater than the housing hole 150, and the housing hole 150 may thus be sealed by the pad surface 220 of the pedal pad 200 when the pedal pad 200 is pivoted forward thereof.

When the pedal pad 200 is fully pivoted forward centered on the hinge pin 210, the pad surface 220 of the pedal pad 200 may be unable to pass through the housing hole 150. Therefore, the pad surface 220 may be supported by the pedal housing 100, naturally restraining the forward pivot of the pedal pad 200.

Furthermore, the housing hole 150 may be sealed by the pad surface 220 of the pedal pad 200, it may thus be advantageous for airtightness to prevent the inflow of a foreign material, and also to block noise toward the interior.

The hysteresis module 300 according to various exemplary embodiments of the present invention may include: a lever housing 310 having one end portion pivotably coupled to a fixed shaft 160 disposed in the pedal housing 100 and supported by the support member 500 by overlapping the support member 500 when the support member 500 performs the advance movement; a pivoted lever 320 disposed in the lever housing 310 and provided pivotably by having a hinge portion 321 passing through the fixed shaft 160 on its one end; a friction bush 330 coupled to the fixed shaft 160 and generating a friction force by being in contact with the pivoted lever 320 when the pivoted lever 320 is pivoted; a connection link 340 pivotably connecting the other end portion of the pivoted lever 320 and the pedal pad 200 with each other; and a lever spring 350 having opposite end portions respectively supported by the lever housing 310 and the pivoted lever 320.

Figure 11:
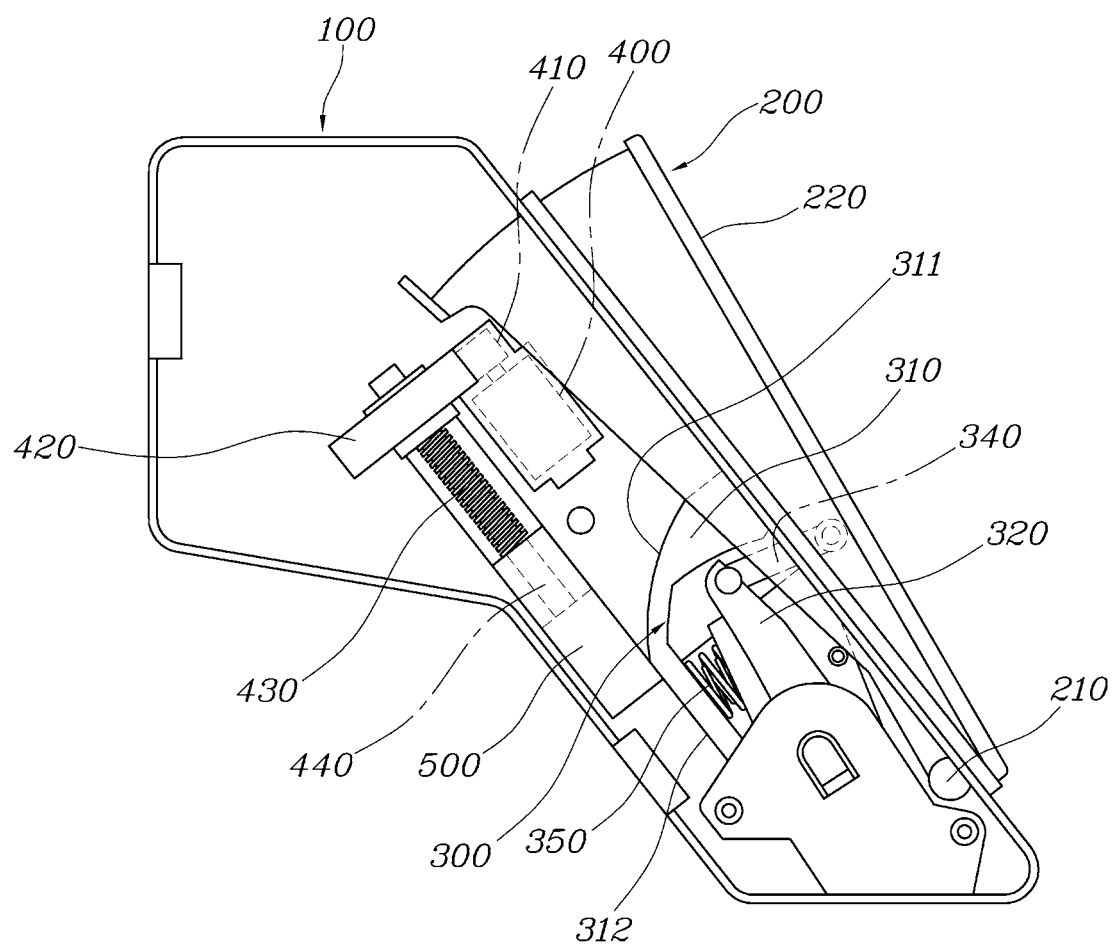
FIG. 11 is a view showing that the popped-up pedal pad is pivoted and operated normally by a driver's operation.

When the driver operates the pedal pad 200 by stepping thereon based on the state in which the pedal pad 200 is popped up as shown in FIGS. 3 and 10, the pedal pad 200 may be pivoted forward centered on the hinge pin 210, the connection link 340 connected to the pedal pad 200 may thus be moved to be inserted into the pedal housing 100 as shown in FIG. 11, and the pivoted lever 320 may then be pivoted centered on the fixed shaft 160 by the movement of the connection link 340. Here, the lever spring 350 may accumulate its elastic force while being compressed.

Furthermore, when the driver releases his or her operating force from the pedal pad 200 in the state of FIG. 11, the pivoted lever 320, the connection link 340 and the pedal pad 200 may return to the popped-up state by a restoring force of the lever spring 350 as shown in FIGS. 3 and 10.

The lever spring 350 may preferably include two springs having different spring forces to tune a stepping pressure by tuning the spring force and to suppress a micro-vibration of the pedal pad 200 in particular, but is not limited to the number of two.

The lever spring 350 may preferably be a compression coil spring.

When the driver operates the pedal pad 200 by stepping thereon, the spring force (compression force) of the lever spring 350 and the friction force of the friction bush 330 may be generated together to act as a resistance force, and it may thus require a large stepping pressure (during the operation) which may overcome such a large resistance force. When the pedal pad 200 returns to its initial position as the driver releases his or her operating force from the pedal pad 200, only the friction force may be generated by the friction bush 330, and the stepping pressure (during the return) may be decreased relative to the stepping pressure during the operation.

As described above, the difference between the stepping pressure during the operation of the pedal pad 200 and the stepping pressure during its return may be caused by the friction bush 330 corresponding to a friction element, which phenomenon may be referred to as hysteresis in the pedal apparatus.

The hysteresis in the pedal apparatus may be a necessary element to promote a quiet vehicle driving by preventing a sudden change in an amount of pressure on the pedal when an impact occurs due to irregularities on a road or the like, and to reduce the driver's ankle fatigue by maintaining a constant amount of pressure on a pedal arm, especially when driving the vehicle at constant speed or for a long time.

The present invention shows that most of the driver's operating force may be supported in the pedal housing 100 by the pedal pad 200, the connection link 340, the hysteresis module 300 and the support member 500 when the driver operates the pedal pad 200 by stepping thereon in the state in which the pedal pad 200 is popped up as shown in FIGS. 3 and 10, and may thus have a minimized capacity of the motor 400, reducing its cost and weight.

The present invention may further include: a permanent magnet 810 coupled to the hinge portion 321 of the pivoted lever 320; and a non-contact type pedal sensor 820 fixed in the pedal housing 100 to face the permanent magnet 810.

The non-contact type pedal sensor 820 may be a sensor configured for detecting a pivot of the pivoted lever 320 when the driver operates the pedal pad 200 by stepping thereon, and may detect a pivoted angle of the pedal pad 200 by a change in a magnetic field strength of the permanent magnet 810 based on a change in its position when the pivoted lever 320 is pivoted, generating a signal related to a function of a pedal.

The non-contact type pedal sensor 820 may be electrically connected to the power supply such as a battery by a wire, and may reduce noise during its operation when compared to a contact type sensor which is directly connected to the pedal pad by a link or the like, and further improve accuracy of an output signal in particular.

The non-contact type pedal sensor 820 may be either one of an accelerator position sensor (APS) generating a signal related to acceleration and a brake position sensor (BPS) generating a signal related to braking.

The pedal pad 200 may be connected to a stroke sensor 900 by a sensor lever 910, and the stroke sensor 900 may be fixed in the pedal housing 100 and are configured to detect whether the pedal pad 200 returns to its initial position when the pedal pad 200 is operated.

A sensor pin 930 may be coupled to the pedal pad 200; and the sensor pin may be coupled to the sensor lever 910 of the stroke sensor 900 fixed to the pedal housing 100. The stroke sensor 900 is configured to detect whether the pedal pad 200 returns to its initial position when the pedal pad 200 is operated, and may further serve an auxiliary function of the APS or BPS, which is the non-contact type pedal sensor 820.

The hinge pin 210 provided as the pivoted center portion of the pedal pad 200 may be disposed at a position almost coincident with a lower end portion 221 of the pad surface 220 to reduce its package as shown in FIG. 3. In the instant case, when the pedal pad 200 is in the popped-up state, the lower end portion 221 of the pad surface 220 may be disposed in the pedal housing 100 and thus may not be exposed. Here, a line of the lower end portion 221 of the pad surface 220 may be obscured by the pedal housing 100 and thus may not be visible, which may adversely affect a design of the pedal.

Figure 8:
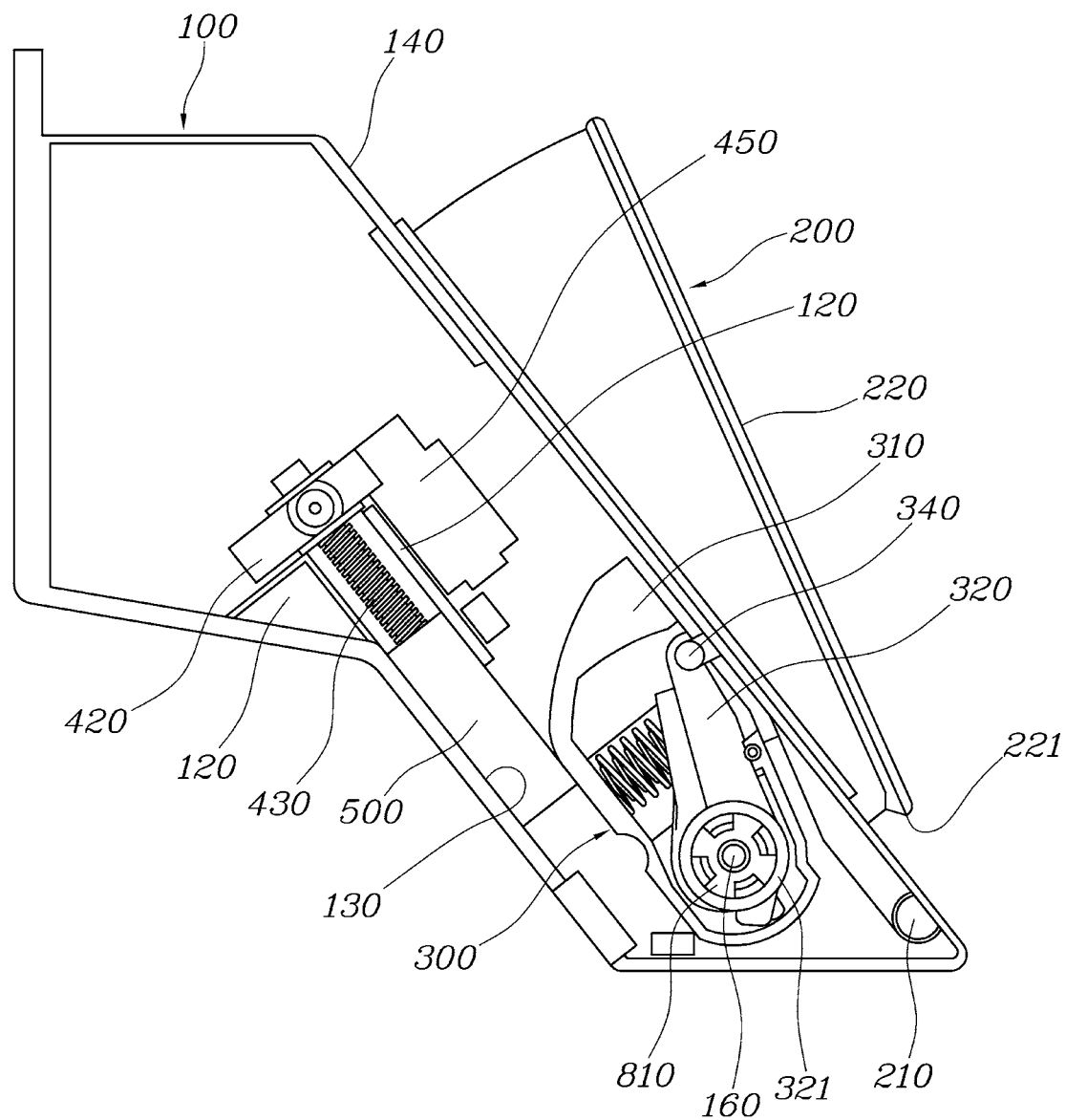
FIG. 8 is a view of a pedal pad according to various exemplary embodiments of the present invention.

Accordingly, in another exemplary embodiment of the present invention as shown in FIG. 8, the hinge pin 210 provided as the pivoted center portion of the pedal pad 200 may be disposed below the lower end portion 221 of the pad surface 220 to allow the lower end portion 221 of the pad surface 220 to be completely exposed from the pedal housing 100 when the pedal pad 200 is in the popped-up state, making the line of the lower end portion 221 of the pad surface 220 visible to improve the design of the pedal.

The support member 500 according to various exemplary embodiments of the present invention may be configured to be in contact with the forward inclined surface 130 of the pedal housing 100 as shown in FIG. 3; and the fixed shaft 160 provided as the pivoted center portion of the hysteresis module 300 may be disposed between the forward inclined surface 130 and backward inclined surface 140 of the pedal housing 100, making the pivoted center portion (fixed shaft 160) of the hysteresis module 300 to be eccentrically disposed to be more backward than the support member 500. In the present manner, the hysteresis module 300 may be smoothly pivoted centered on the fixed shaft 160 when the support member 500 performs the advance movement.

If the fixed shaft 160 provided as the pivoted center portion of the hysteresis module 300 is further moved forward in the state of FIG. 3 to be disposed close to the forward inclined surface 130 of the pedal housing 100, and internally disposed within the cross-sectional thickness or cross-sectional height of the support member 500 in the forward or backward direction thereof, even when the support member 500 performs the advance movement, the hysteresis module 300 may be unable to be smoothly pivoted centered on the fixed shaft 160, which may cause a stuck phenomenon of the hysteresis module 300. To prevent the present phenomenon, the fixed shaft 160 provided as the pivoted center portion of the hysteresis module 300 needs to be eccentrically disposed to be more backward than the support member 500.

According to various exemplary embodiments of the present invention, both one surface of the support member 500 (surface facing forward) and the forward inclined surface 130 of the pedal housing 100 may be flat, and the one surface of the support member 500 and the forward inclined surface 130 may always be in surface-contact with each other. In the present manner, the support member 500 may safely perform the advance or retreat movement, and furthermore, the hysteresis module 300 may thus be more stably propped up and supported.

Meanwhile, the lever housing 310 included in the hysteresis module 300 may have a surface in contact with the support member 500, the surface having a curved portion 311 and a flat portion 312.

The curved portion 311 of the lever housing 310 may allow entry of the support member 500 for the support member 500 to be easily inserted between the pedal housing 100 and the lever housing 310 when the support member 500 performs the advance movement in a state of being retreated as shown in FIG. 9.

Furthermore, the flat portion 312 of the lever housing 310 may become a surface supported by the support member 500 while overlapping the other surface of the advance-moved support member 500 (surface facing backward) as shown in FIG. 10.

When the support member 500 performs the advance movement or the retreat movement in contact with the curved portion 311 after leaving the flat portion 312 of the lever housing 310, the lever housing 310 may be moved to be pivoted centered on the fixed shaft 160. When the support member 500 leaves the curved portion 311 of the lever housing 310 and is moved in contact with the flat portion 312, the lever housing 310 is not moved to be pivoted centered on the fixed shaft 160. Accordingly, the support member 500 may stably prop up and support the lever housing 310, supporting a load of the hysteresis module 300.

The other surface of the support member 500 (surface facing backward) may be formed flat and always be in surface-contact with the flat portion 312 of the lever housing 300. Accordingly, the support member 500 may stably prop up and support the lever housing 310.

FIG. 9 shows that the support member 500 performs the retreat movement by the operation of the motor 400 and is released from the state of propping up and supporting the hysteresis module 300. Here, the pedal pad 200 may be in the hidden state of being pivoted forward by the elastic force of the pedal return spring 700 to be inserted into the pedal housing 100. Accordingly, the pedal pad 200 may be in the hidden state in which its exposure is blocked.

When the support member 500 performs the retreat movement to be away from the hysteresis module 300 (movement in a direction toward the second gear 420) by the operation of the motor 400 and is thus released from the state of propping up and supporting the hysteresis module 300, the hysteresis module 300 may be pivoted counterclockwise, centered on the fixed shaft 160 by the elastic force of the pedal return spring 700, the pedal pad 200, which is connected to the hysteresis module 300 by the connection link 340 as the hysteresis module 300 is pivoted, may be pivoted forward centered on the hinge pin 210 at its lower end portion, and the pedal pad 200 may thus be in the hidden state of being inserted into the pedal housing 100.

When the pedal pad 200 is in the hidden state as described above, the space below the driver's seat may become a large space without pedal interference, allowing the driver to take a comfortable rest in a relaxation mode, and furthermore, improving the driver's safety by preventing the driver's mal-operation of the pedal in the autonomous driving mode.

FIGS. 3 and 10 each show that the pedal pad 200 is in the popped-up state of being pivoted backward, i.e., toward the driver, to protrude from the pedal housing 100.

In the hidden state of the pedal pad 200 described above, when the support member 500 performs the advance movement toward the hysteresis module 300 by the operation of the motor 400, the advance-moved support member 500 may be inserted between the pedal housing 100 and the hysteresis module 300 to prop up and support the flat portion 312 of the lever housing 310. In the present process, the hysteresis module 300 may be pivoted while overcoming the elastic force of the pedal return spring 700, and when the support member 500 is in the state of propping up and supporting the hysteresis module 300, the pedal pad 200 may be in the popped-up state of protruding from the pedal housing 100.

When the pedal pad 200 is in the popped-up state of protruding from the pedal housing 100 as described above, the driver may operate normally the pedal by stepping on the pad surface 220 of the protruding pedal pad 200.

FIG. 11 shows a state in which the driver steps on and operates the pedal pad 200 popped up to protrude from the pedal housing 100.

When the driver steps on and operates the pedal pad 200 popped up to protrude from the pedal housing 100, the pedal pad 200 may be pivoted forward centered on the hinge pin 210, the connection link 340 connected to the pedal pad 200 may thus be moved to be inserted into the pedal housing 100, and the pivoted lever 320 may then be pivoted centered on the fixed shaft 160 by the movement of the connection link 340. Here, the lever spring 350 may accumulate its elastic force while being compressed.

Furthermore, when the pivoted lever 320 of the hysteresis module 300 is pivoted as the pedal pad 200 is pivoted by the driver's operation, the permanent magnet 810 coupled to the hinge portion 321 of the pivoted lever 320 may also be pivoted. Here, the non-contact type pedal sensor 820 may detect the pivoted angle of the pedal pad 200 by the change in a magnetic flux of the permanent magnet 810 based on its pivot, generating the signal related to the function of the pedal (the signal related to acceleration or the signal related to braking).

In according to various exemplary embodiments of the present invention, when the hysteresis module 300 is pivoted as the support member 500 performs the advance movement or the retreat movement by the operation of the motor 400, and the position of the permanent magnet 810 is changed while the pedal pad 200 is pivoted to be in the hidden or popped-up state as the hysteresis module 300 is pivoted, the non-contact type pedal sensor 820 does not generate the signal related to the function of the pedal (the signal related to acceleration or the signal related to braking) to prevent a malfunction of the pedal.

That is, when the pedal pad 200 is changed to the hidden state as shown in FIG. 9 or to the popped-up state as shown in FIG. 10, by the operation of the motor 400, the non-contact type pedal sensor 820 does not generate the signal related to the function of the pedal even though the position of the permanent magnet 810 is changed, preventing an accident caused by its malfunction.

However, in a case where the pedal pad 200 is in the popped-up state and the motor 400 is not operated as shown in FIG. 11, only when the pedal pad 200 is pivoted by the driver's operation, the hysteresis module 300 is pivoted by the connection link 340 as the pedal pad 200 is pivoted, and the position of the permanent magnet 810 is changed as the hysteresis module 300 is pivoted, the non-contact type pedal sensor 820 may generate the signal related to the function of the pedal, allowing the pedal to be more stably operated.

Meanwhile, the foldable pedal apparatus according to various exemplary embodiments of the present invention may be used as either one of an accelerator pedal apparatus and a brake pedal apparatus in an autonomous driving vehicle, or may be used as both the accelerator pedal apparatus and the brake pedal apparatus.

As described above, the present invention may provide the foldable pedal apparatus of a vehicle with a hysteresis module, in which: the pedal pad 200 is in the popped-up state of protruding from the pedal housing 100 to be exposed toward the driver to make it possible for the driver to operate the pedal pad 200, in the manual driving mode in which the driver directly drives the vehicle; the pedal pad 200 is in the hidden state of being inserted into the pedal housing 100 and blocked from being exposed to the driver to make it impossible for the driver to operate the pedal pad 200, in the autonomous driving mode in which the driver does not directly drive the vehicle; and the hysteresis may be implemented by including the hysteresis module 300, allowing the driver to take a comfortable rest in the autonomous driving mode, and furthermore, improving the driver's safety by preventing the driver's mal-operation of the pedal in the autonomous driving mode.

Furthermore, the present invention may provide the foldable pedal apparatus of a vehicle with a hysteresis module, in which the motor 400 fixed in the pedal housing 100 is accommodated in the internal space of the pedal pad 200 when the pedal pad 200 is in the hidden state of being inserted into the pedal housing 100, and may thus have the efficient layout structure, having a reduced overall size.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable pedal apparatus for a vehicle with a hysteresis module, the foldable pedal apparatus comprising:
    a pedal housing fixed in a predetermined place of the vehicle below a driver's seat;
    a pedal pad pivotably coupled to the pedal housing and configured to be operated by the driver;
    the hysteresis module pivotably provided in the pedal housing, connected to the pedal pad, and configured for generating hysteresis when the pedal pad is operated by the driver;
    a motor fixed in the pedal housing; and
    a support member mounted to be in contact with the pedal housing and the hysteresis module, and connected to the motor to perform an advance movement or a retreat movement by power of the motor,
    wherein the pedal pad is changed to a hidden state of being inserted into and hidden in the pedal housing or to a popped-up state of protruding from the pedal housing as the hysteresis module is pivoted by the advance movement or the retreat movement of the support member.

2. The foldable pedal apparatus of claim 1, further including a motor control printed circuit board (PCB) fixed in the pedal housing and electrically connected to the motor to control an operation of the motor.

3. The foldable pedal apparatus of claim 1, wherein the pedal pad has a lower end portion pivotably coupled to the pedal housing by a hinge pin, is connected to the hysteresis module above the hinge pin, and has an upper end portion pivoted forwards and backwards centered on the hinge pin.

4. The foldable pedal apparatus of claim 3, wherein the hinge pin is disposed below a lower end portion of a pad surface disposed on the pedal pad to allow the lower end portion of the pad surface to be exposed from the pedal housing when the pedal pad is in the popped-up state.

5. The foldable pedal apparatus of claim 1, further including a pedal return spring having first and second end portions supported by the pedal housing and the hysteresis module, respectively, and providing the pedal pad with an elastic force for the pedal pad to be pivoted in a direction in which the pedal pad is inserted into the pedal housing.

6. The foldable pedal apparatus of claim 5,
    wherein the hysteresis module is pivoted while overcoming the elastic force of the pedal return spring when the support member performs the advance movement by an operation of the motor to be inserted between the pedal housing and the hysteresis module, and
    wherein the pedal pad is changed to the popped-up state of protruding from the pedal housing when the support member is in a state of propping up and supporting the hysteresis module.

7. The foldable pedal apparatus of claim 5, wherein when the support member performs the retreat movement by an operation of the motor and is released from a state of propping up and supporting the hysteresis module, the pedal pad receives the elastic force of the pedal return spring through the hysteresis module, and is pivoted to be changed to the hidden state of being inserted into the pedal housing.

8. The foldable pedal apparatus of claim 1, wherein the hysteresis module includes:
    a lever housing having an end portion pivotably coupled to a fixed shaft disposed in the pedal housing and supported by the support member by overlapping the support member when the support member performs the advance movement;
    a pivoted lever disposed in the lever housing and having a hinge portion pivotally coupled to the fixed shaft on a first end portion of the pivoted lever;
    a friction bush coupled to the fixed shaft and generating a friction force by being in contact with the pivoted lever when the pivoted lever is pivoted;
    a connection link pivotably connecting a second end portion of the pivoted lever and the pedal pad with each other; and
    a lever spring having first and second end portions supported by the lever housing and the pivoted lever, respectively.

9. The foldable pedal apparatus of claim 8, further including:
    a permanent magnet coupled to the hinge portion of the pivoted lever; and
    a non-contact pedal sensor fixed in the pedal housing to face the permanent magnet,
    wherein the non-contact pedal sensor detects a pivoted angle of the pedal pad by a change in a magnetic flux of the permanent magnet when the pivoted lever is pivoted, generating a signal related to a function of a pedal.

10. The foldable pedal apparatus of claim 9, wherein when the hysteresis module is pivoted as the support member performs the advance movement or the retreat movement by an operation of the motor, and a position of the permanent magnet is changed while the pedal pad is pivoted to be in the hidden or popped-up state as the hysteresis module is pivoted, the non-contact pedal sensor is configured to not generate the signal related to the function of the pedal to prevent a malfunction of the pedal.

11. The foldable pedal apparatus of claim 9, wherein when the pedal pad is in the popped-up state and the motor is not operated and a position of the permanent magnet is changed as the pedal pad is pivoted in accordance with the driver's operation, the non-contact pedal sensor is configured to generate the signal related to the function of the pedal.

12. The foldable pedal apparatus of claim 9, wherein the non-contact pedal sensor is an accelerator position sensor (APS) generating a signal related to acceleration or a brake position sensor (BPS) generating a signal related to braking.

13. The foldable pedal apparatus of claim 8,
    wherein the support member is configured to be in contact with a forward inclined surface of the pedal housing, and
    wherein the fixed shaft provided as a pivoted center portion of the hysteresis module is disposed between the forward inclined surface and a backward inclined surface of the pedal housing, making the pivoted center portion of the hysteresis module to be eccentrically disposed to be more backward than the support member.

14. The foldable pedal apparatus of claim 8, wherein one surface of the support member and the forward inclined surface of the pedal housing are flat, and the one surface of the support member and the forward inclined surface are continuously in contact with each other.

15. The foldable pedal apparatus of claim 8,
wherein the lever housing has a surface in contact with the support member, the surface having a curved portion and a flat portion,
wherein the curved portion of the lever housing allows entry of the support member for the support member to be inserted between the pedal housing and the lever housing when the support member is configured to perform the advance movement in a state of being retreated, and
wherein the flat portion of the lever housing is supported by the support member while overlapping another surface of the advance-moved support member.

16. The foldable pedal apparatus of claim 15, wherein another surface of the support member is flat and continuously in contact with the flat portion of the lever housing.

17. The foldable pedal apparatus of claim 1,
wherein a sensor pin is coupled to the pedal pad, and
wherein the sensor pin is coupled to a sensor lever of a stroke sensor fixed to the pedal housing.

18. The foldable pedal apparatus of claim 1, wherein the pedal housing has a guide portion guiding the advance movement and the retreat movement of the support member for the support member to be moved in a state of being continuously in contact with a forward inclined surface of the pedal housing.

19. The foldable pedal apparatus of claim 18, further including:
a first gear fixed to the motor;
a second gear gear-engaged to the first gear;
a lead screw, wherein a first end portion of the lead screw is coupled to the second gear; and
a nut coupled to the lead screw and coupled to the support member.

20. The foldable pedal apparatus of claim 1, wherein the foldable pedal apparatus is used as an accelerator pedal apparatus or a brake pedal apparatus.

* * * * *